United States Patent [19]

Inoue et al.

[11] Patent Number: 5,069,306
[45] Date of Patent: Dec. 3, 1991

[54] MOUNTING STRUCTURE FOR THE POWER UNIT OF A MOTOR VEHICLE

[75] Inventors: Kazuo Inoue; Shoichi Sano, both of Tokyo; Masami Ogura, Saitama; Kenichi Nagahiro, Saitama; Tsuneo Konno, Saitama; Hajime Kajiwara, Saitama; Yoshinobu Ono, Saitama; Suguru Yoshida, Saitama; Hiroo Shimada, Saitama; Masahiro Hashiguchi, Saitama, all of Japan

[73] Assignee: Honda Giken Kogyo Kabushiki Kaisha, Tokyo, Japan

[21] Appl. No.: 336,656

[22] Filed: Apr. 11, 1989

[30] Foreign Application Priority Data

Apr. 11, 1988 [JP] Japan .................................. 63-88628

[51] Int. Cl.⁵ .............................................. B60K 1/00
[52] U.S. Cl. .................................. 180/291; 180/297; 280/719
[58] Field of Search ............... 180/312, 291, 297, 148, 180/147, 79.1, 309; 280/719

[56] References Cited

U.S. PATENT DOCUMENTS

| | | | |
|---|---|---|---|
| 2,448,345 | 8/1948 | Aronson | 180/170 |
| 3,186,507 | 6/1965 | Dangauthier | 180/297 |
| 3,426,863 | 2/1969 | Hanson | 180/79.1 |
| 4,392,545 | 7/1983 | Harasaki et al. | 180/297 |
| 4,516,650 | 5/1985 | Yamaguchi et al. | 180/68.3 |
| 4,623,031 | 11/1986 | Drutchas et al. | 180/148 |

FOREIGN PATENT DOCUMENTS

| | | | |
|---|---|---|---|
| 0218693 | 3/1987 | European Pat. Off. | |
| 0243102 | 4/1987 | European Pat. Off. | |
| 318753 | 6/1989 | European Pat. Off. | 280/719 |
| 2700715A1 | 7/1978 | Fed. Rep. of Germany | |
| 49-19230 | 5/1974 | Japan | |
| 31824 | 3/1981 | Japan | 180/297 |
| 58-501626 | 9/1983 | Japan | |
| 997804 | 7/1965 | United Kingdom | |
| 1125028 | 8/1968 | United Kingdom | |
| 1293203 | 10/1972 | United Kingdom | |
| 8706539 | 11/1987 | World Int. Prop. O. | 280/719 |

Primary Examiner—Andres Kashnikow
Assistant Examiner—Eric Culbreth
Attorney, Agent, or Firm—Lyon & Lyon

[57] ABSTRACT

A power unit mounting structure in a motor vehicle includes a power unit comprising an engine having a crankshaft, a transmission coupled to the crankshaft of the engine, and a differential interposed between drive axles connected to a pair of laterally spaced front road wheels of the motor vehicle and the transmission. The power unit is mounted in a front portion of the motor vehicle with its center of gravity positioned rearwardly of the drive axles extending from the differential toward front road wheels serving as the drive road wheels. A steering gearbox extends parallel to the drive axles and is disposed forwardly of the drive axles.

3 Claims, 4 Drawing Sheets

MOUNTING STRUCTURE FOR THE POWER UNIT OF A MOTOR VEHICLE

The present invention relates to a power unit mounting structure of a motor vehicle including a power unit comprising an engine having a crankshaft, a transmission coupled to the crankshaft of the engine, and a differential interposed between a pair of laterally spaced front road wheels of the motor vehicle and the transmission, the power unit being mounted with the crankshaft extending transversely with respect to the motor vehicle.

One power unit mounting structure of this general type is known from U.S. Pat. No. 3,186,507. With the known power unit mounting structure, the center of gravity of the power unit is positioned above the drive axles of a pair of laterally spaced front road wheels or forwardly of those drive axles with respect to the direction in which the motor vehicle runs. Therefore, a greater load is applied by the weight of the power unit to the front road wheels than to the rear road wheels. For better running characteristics of the motor vehicle, however, it is desirable that equal loads be distributed to the front and rear road wheels.

It is an object of the present invention to provide a mounting structure for mounting the power lift of a motor vehicle to better equalize loads applied by the power unit to front and rear road wheels for improved running characteristics of the motor vehicle.

According to a first feature of the present invention, the power unit is mounted in a front portion of the motor vehicle with its center of gravity positioned rearwardly of the drive axles extending from the differential toward the front road wheels with respect to the running direction of the motor vehicle and a steering gearbox extending parallel to the drive axles is disposed forwardly of the drive axles with respect to the running direction.

According to another feature of the present invention, the power unit is mounted with its center of gravity displaced from the drive axles extending from the differential toward the drive road wheels, toward a central position between front and rear road wheels, and a suspension spring is positioned on a side of said drive axles which is opposite to said center of gravity of the power unit.

According to still another feature of the present invention, the power unit is mounted in a front portion of the motor vehicle with its center of gravity positioned rearwardly of the drive axles extending from the differential toward front road wheels serving as the drive road wheels with respect to the running direction in which the motor vehicle runs, a steering gearbox extending parallel to the drive axles and a suspension spring are disposed forwardly of the drive axles with respect to said running direction, and an intake system coupled to the engine is positioned forwardly of the engine and an exhaust system coupled to the engine extends rearwardly from the engine with respect to said running direction.

According to one of the features of the invention, since the center of gravity of the power unit is displaced from the drive axles of the drive road wheels toward the central position between the front and rear road wheels, loads applied by the weight of the power unit to the front and rear road wheels are better equalized for improved running characteristics of the motor vehicle.

With the steering gearbox positioned forwardly of the drive axles, the power unit can easily be located behind the drive axles.

According to another feature, loads applied to the front and rear road wheels are better equalized, and since the suspension spring is positioned on the side of the drive axles which is opposite to the center of gravity of the power unit, the center of gravity of the power unit can easily be displaced from the drive axles toward the central position between the front and rear road wheels.

In accordance with still another feature, loads applied to the front and rear road wheels are better equalized, and the power unit can easily be positioned rearwardly of the drive axles. Moreover, the intake and exhaust efficiencies can be increased.

The preferred embodiments of the present invention will hereinafter be described with reference to the drawings, wherein.

Figure 1:
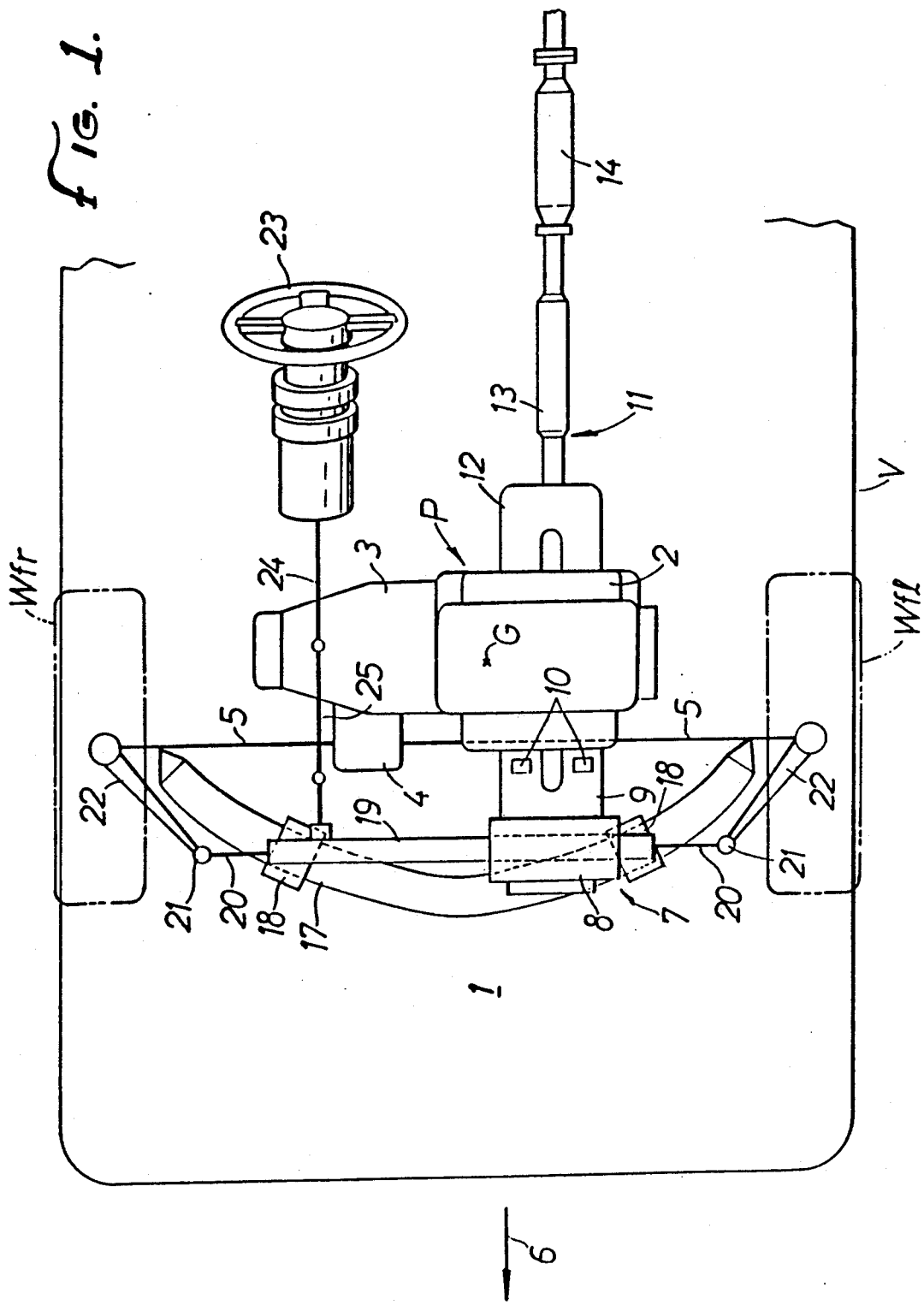
FIG. 1 is a plan view of a first embodiment of the invention.
Figure 2:
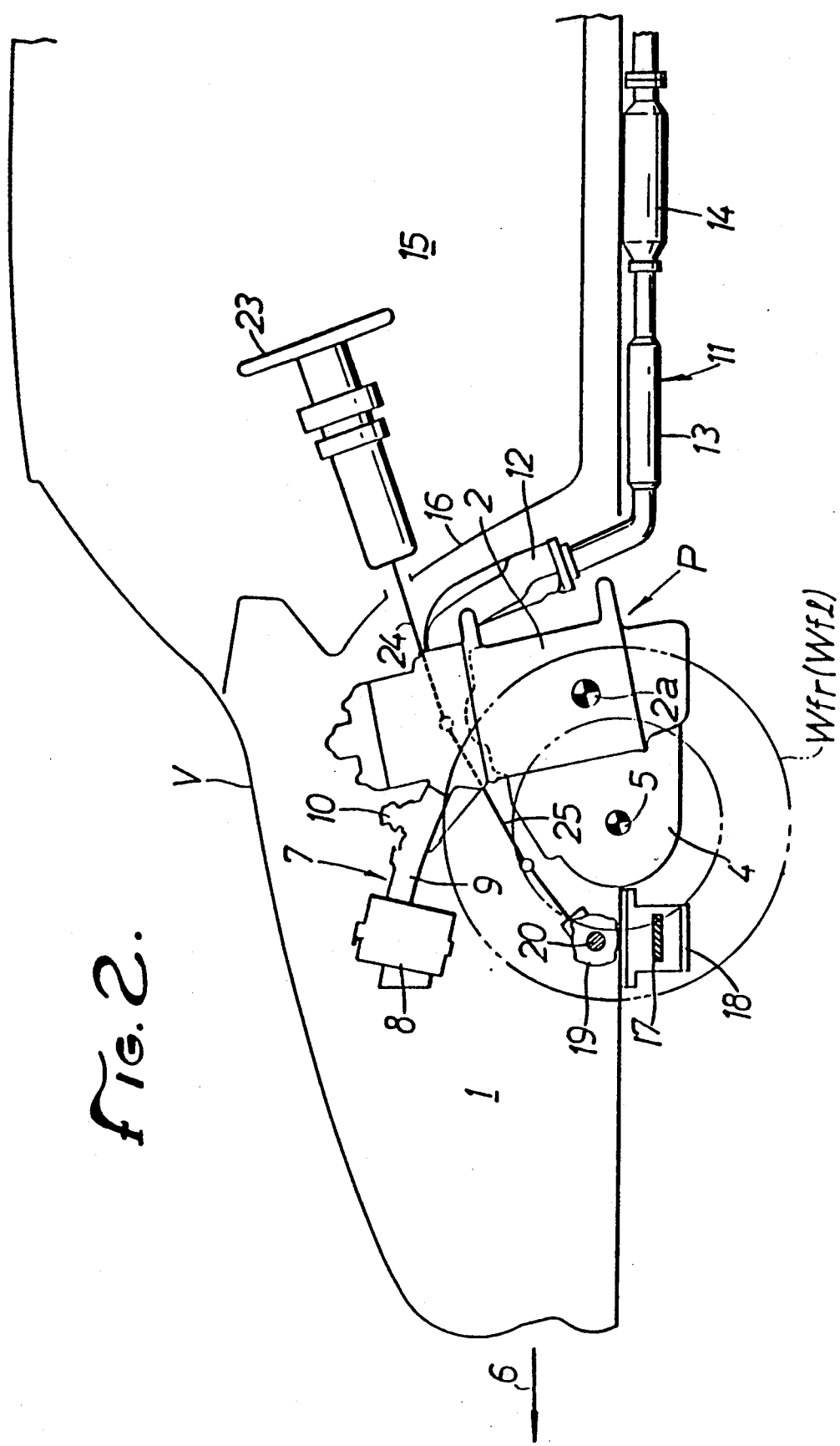
FIG. 2 is a side elevation view of the embodiment of FIG. 1.

In FIGS. 1 and 2, a motor vehicle V is a FF (front engine/front drive) motor vehicle having a power unit P mounted in an engine compartment 1 defined in a front portion of the motor vehicle V.

The power unit P comprises an engine 2 having a crankshaft $2a$, a transmission 3 coupled to the crankshaft $2a$, and a differential 4 interposed between a pair of drive axles 5 connected to a pair of laterally spaced front road wheels Wfl, Wfr of the motor vehicle v and the transmission 3. The power unit P is disposed in the engine compartment 1 such that the crankshaft $2a$ of the engine 2 extends in a transverse direction of the motor vehicle V and the power unit P has its center of gravity G positioned rearwardly of the drive axles 5 that extend from the differential 4 toward the front road wheels Wfl, Wfr, with respect to a direction 6 in which the motor vehicle runs.

The transmission 3 is joined to one end of the engine 2 in the axial direction of the crankshaft $2a$. The differential 4 is joined to a front portion of the transmission 3 for connection to the drive axles 5. The power unit P located in the engine compartment 1 is tilted forwardly from the vertical in the running direction 6.

An intake system 7 for supplying an air-fuel mixture to the engine 2 comprises an air cleaner 8, an intake manifold 9 interconnecting the air cleaner 8 and intake ports (not shown) of the engine 2, and fuel injection valves 10 for injecting fuel toward the intake ports into air supplied from the air cleaner 8 to the intake ports to produce an air-fuel mixture. The intake system 7 extends forwardly in the running direction 6 from an upper front end portion of the engine 2.

An exhaust system 11 for discharging exhaust gases from the engine 2 comprises an exhaust manifold 12 connected to exhaust ports (not shown) of the engine 2, a flexible pipe 13 coupled to the exhaust manifold 12, a catalytic converter 14 connected to the rear end of the flexible pipe 13, and a muffler (not shown) joined to the rear end of the catalytic converter 14. The exhaust system 11 extends rearwardly in the running direction 6 from an upper rear end portion of the engine 2. The exhaust manifold 12 has an appropriate length to increase the output power of the engine 2. The exhaust manifold 12 extends downwardly along a rear portion of the engine 2 between the forwardly tilted engine 2 and a toeboard 16 which separates the engine compartment 1 from a passenger compartment 15. The flexible pipe 13 connected to the exhaust manifold 12 is bent so as to extend rearwardly along the running direction 6. This arrangement allows the catalytic converter 14 to be positioned as closely to the engine 2 as possible. Since the exhaust system 11 is disposed behind the power unit P with respect to the running direction 6, ram air is prevented by the power unit P from hitting the exhaust system 11, so that the temperature of exhaust gases flowing through the exhaust system 11 is prevented from being lowered, and the gas purifying function of the exhaust system is effectively performed.

A leaf spring 17 is used as a suspension to support the front road wheels Wfl, Wfr on a vehicle body (not shown). The leaf spring 17 is positioned on a side of the drive axles 5 which is opposite to the center of gravity G of the power unit P, i.e., in front of the power unit P and the drive axles 5 with respect to the running direction 6, and supported at two areas, for example, in the transverse direction of the motor vehicle V on the vehicle body by means of supports 18. The opposite ends of the leaf spring 17 are connected respectively to the front road wheels Wfl, Wfr. The leaf spring 17 is curved such that the longitudinally central portion of the leaf spring 17, i.e., the central portion thereof in the transverse direction of the motor vehicle v, is positioned forwardly of the opposite ends of the leaf spring 17 in the running direction 6 in order to accommodate the forwardly projecting differential 4 of the power unit P.

The front road wheels Wfl, Wfr can be steered by a steering gear box 19 disposed forwardly of the drive axles 5 and upwardly of the leaf spring 17. The steering gearbox 19 has a pair of tie rods 20 extending parallel to the drive axles 5 and connected to a rack bar (not shown) movable laterally in the steering gearbox 19 in response to steering operation. The tie rods 20 are connected respectively to hub carriers 22 of the front road wheels Wfl, Wfr through respective ball joints 21.

A steering wheel 23 is positioned in the passenger compartment 15 at the driver's seat and connected to a steering shaft 24 which is coupled to a pinion (not shown) in the steering gearbox 19 through a steering joint 25. The pinion meshes with the rack bar. The steering shaft 24 and the steering joint 25 are disposed laterally of the engine 2 and above the transmission 3.

The above embodiment offers the following advantages: Since the center of gravity G of the power unit P is displaced from the drive axles 5 of the front road wheels Wfl, Wfr toward the central position between the front and rear wheels, i.e., is located rearwardly of the drive axles 5 of the front road wheels Wfl, Wfr with respect to the running direction 6, the gravitational loads applied by the power unit P to the front road wheels Wfl, Wfr and rear road wheels (not shown) are better equalized for improved running characteristics of the motor vehicle.

The intake system 8 is disposed forwardly of the engine 2 and the exhaust system 11 is disposed rearwardly of the engine 2. Therefore, the intake and exhaust systems 8, 11 are of a cross-flow arrangement with respect to the engine for increasing intake and exhaust efficiencies to increase the output power of the engine. Inasmuch as the power unit P is forwardly tilted, the intake ports of the engine 2 are directed substantially in-line with the intake manifold 9 to lower the resistance to the flow of air in the intake system 8. With the forwardly tilted power unit P, moreover, the drive axles 5, the steering gearbox 19, and the leaf spring 17 can easily be positioned in front of the power unit P, and the engine hood covering the engine compartment 1 is prevented from being raised. In addition, the forwardly tilted power unit P facilitates the installation of the exhaust system 11 between the engine 2 and the toeboard 16 which is also forwardly tilted.

The catalytic converter 14 is connected to the exhaust manifold 12 through the flexible pipe 13 which is bent to position the catalytic converter 14 as close to the engine 2 as possible whereby the catalytic converter can perform properly. More specifically, even when the temperature of exhaust gases is low in a lean-burn range in which a lean air-fuel mixture is burned for better fuel economy, it is possible to keep the temperature of exhaust gases as they flow into the catalytic converter 14 at an elevated temperature level required to perform the function of the catalytic converter 14 properly since the catalytic converter 14 is located near the engine 2.

The steering gearbox 19 is situated forwardly of the drive axles 5 and the leaf spring 17 is located below the steering gearbox 19, making it possible to position the power unit P behind the drive axles 5. Since the leaf spring 17 is curved with its longitudinally central portion positioned forwardly of its opposite ends in the running direction 6, the leaf spring 17 is positioned out of physical interference with the power unit P for achieving a sufficient stroke and leveling.

Inasmuch as the steering gearbox 19 is positioned in front of the drive axles 5, the steering shaft 24 and the steering gearbox 19 are connected to each other without undue limitations and hence can be designed with ease.

Figure 3:
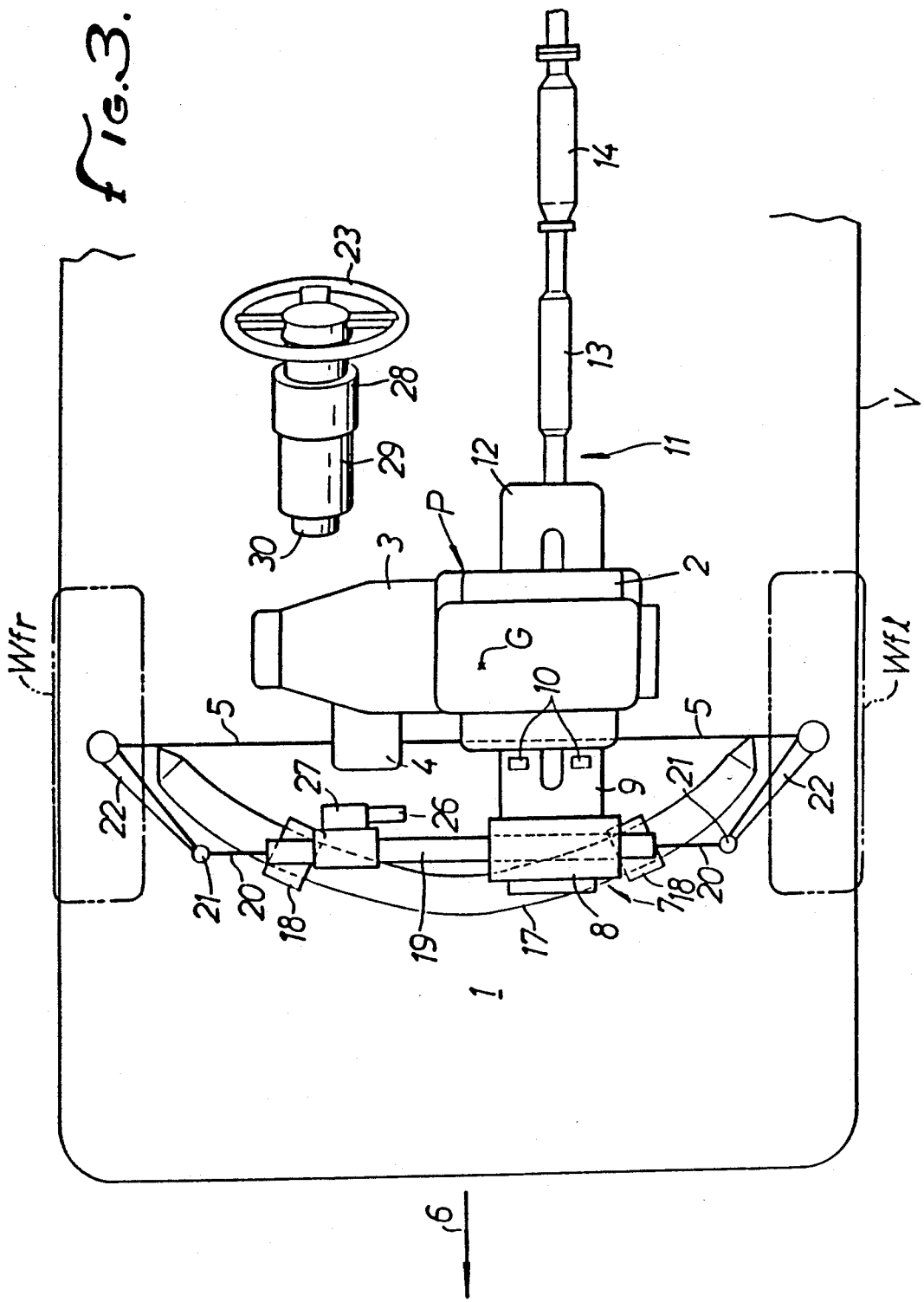
FIG. 3 is a plan view of a second embodiment of the invention.
Figure 4:
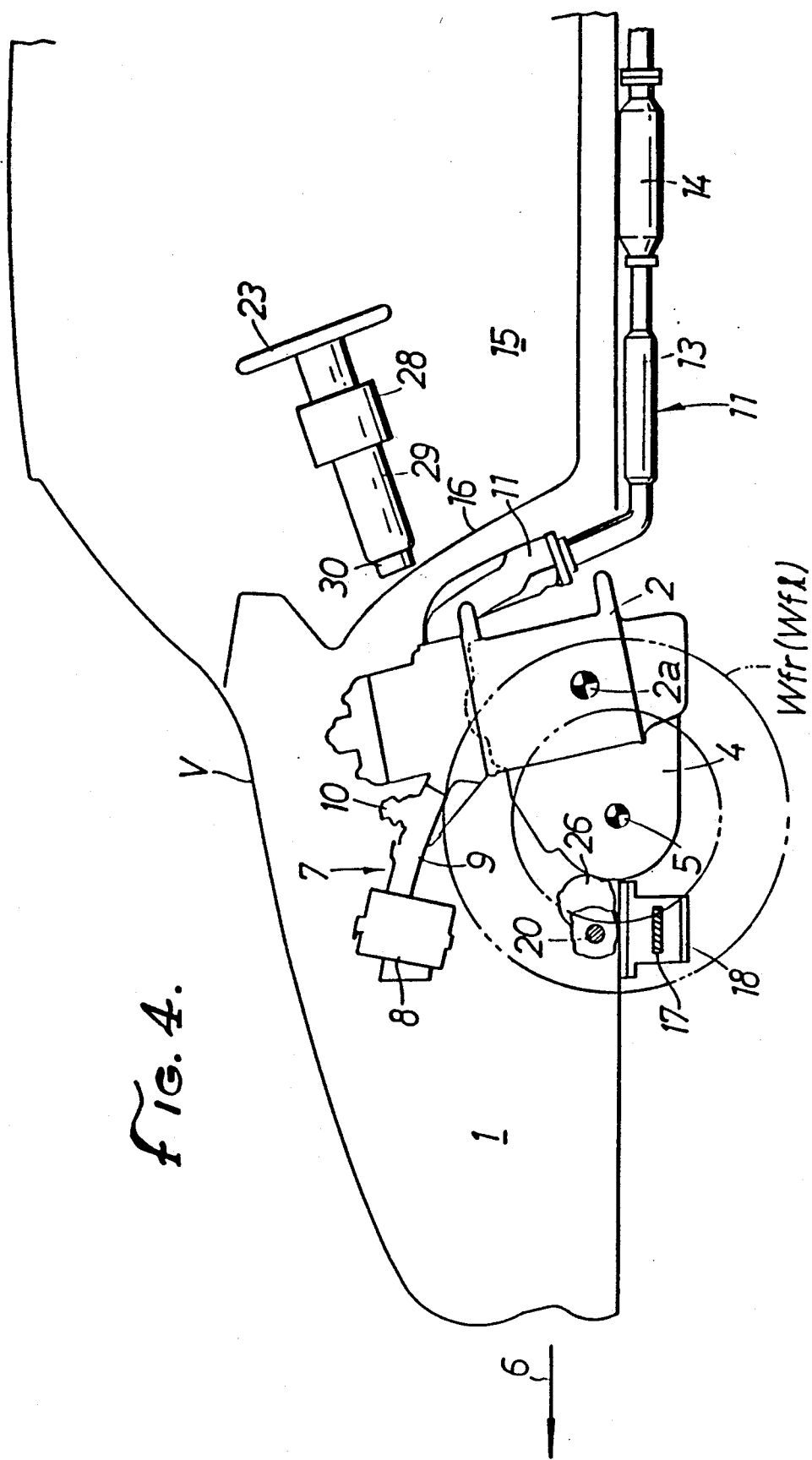
FIG. 4 is a side elevation view of the embodiment of FIG. 3.

FIGS. 3 and 4 show another embodiment of the present invention. Those parts in FIGS. 3 and 4 which are identical to those of the preceding embodiment are denoted by identical reference numerals.

According to the embodiment of FIGS. 3 and 4, a motor 26 which is actuatable by an interval or stroke commensurate with a steered angle produced by turning the steering wheel 23 is associated with the steering gearbox 19, and the steering wheel 23 is not directly coupled to the steering gearbox 19. The motor 26 is joined to the steering gearbox 19 through a motor-driven steering gearbox 27. The rack bar in the steering gearbox 19 is movable laterally by a distance dependent on the interval or stroke which the motor 26 is actuated. The steering wheel 23 is associated with an input angle sensor 28, a reactive force motor 29, and a steered angle sensor or tachometer generator 30. The motor 26 is energizable in response to an output signal from the steered angle sensor 30.

With the embodiment shown in FIGS. 3 and 4, as the steering gearbox 19 and the steering wheel 23 are not directly connected to each other, any members which would otherwise be required to mechanically interconnect the steering gearbox 19 and the steering wheel 23 are unnecessary. Therefore, the weight of the motor vehicle is reduced, and the steering wheel 23 may be located on a lefthand or righthand side of the motor vehicle.

According to the features of the present invention, the power unit is mounted in a front portion of the motor vehicle with its center of gravity positioned rearwardly of the drive axles extending from the differential toward the front road wheels with respect to the running direction of the motor vehicle, and a steering gearbox extending parallel to the drive axles is disposed forwardly of the drive axles with respect to the running direction. Therefore, the center of gravity of the power unit is displaced from the drive axles of the drive road wheels toward the central position between the front and rear road wheels, and hence loads applied by the weight of the power unit to the front and rear road wheels are better equalized for improved running characteristics of the motor vehicle.

According to another feature, the power unit is mounted with its center of gravity displaced from the drive axles extending from the differential toward the drive road wheels, toward a central position between front and rear road wheels, and a suspension spring is positioned on a side of said drive axles which is opposite to said center of gravity of the power unit. Consequently, the center of gravity of the power unit can easily be displaced from the drive axles toward the central position between the front and rear road wheels, so that loads applied to the front and rear road wheels are better equalized for improved running characteristics of the motor vehicle.

According to still another feature, the power unit is mounted in a front portion of the motor vehicle with its center of gravity positioned rearwardly of the drive axles extending from the differential toward front road wheels serving as the drive road wheels with respect to the running direction in which the motor vehicle runs, a steering gearbox extending parallel to the drive axles and a suspension spring are disposed forwardly of the drive axles with respect to said running direction, and an intake system coupled to the engine is positioned forwardly of the engine and an exhaust system coupled to the engine extends rearwardly from the engine with respect to the running direction. With this arrangement, the center of gravity of the power unit can easily be displaced from the drive axles toward the central position between the front and rear road wheels for improved running characteristics of the motor vehicle, and the intake and exhaust efficiencies can be increased.

We claim:

1. A power unit mounting structure in a motor vehicle drivable in a forward running direction including a power unit comprising an engine having a crankshaft, a transmission coupled to the crankshaft of the engine, and a differential interposed between drive axles connected to a pair of laterally spaced front road wheels of the motor vehicle and the transmission, the power unit being mounted in a front portion of the motor vehicle with respect to the running direction of the motor vehicle, with the crankshaft extending transversely with respect to the motor vehicle, characterized in that said power unit is mounted in the front portion of the motor vehicle with its center of gravity positioned rearwardly of the drive axles extending from the differential toward the front road wheels serving as the drive road wheels with respect to said running direction and with the engine generally tilted in the forward running direction;

a steering box extending parallel to the drive axles disposed forward of the drive axles with respect to the running direction; and an exhaust manifold attached to the engine and disposed at least partially in between the engine and a toeboard separating the engine from a passenger compartment of the motor vehicle.

2. A power unit mounting structure according to claim 1, wherein a steering wheel is connected to the steering gearbox through a link.

3. A power unit mounting structure in a motor vehicle including a power unit comprising an engine having a crankshaft, a transmission coupled to the crankshaft of the engine, and a differential interposed between drive axles connected to a pair of laterally spaced drive road wheels of the motor vehicle and the transmission, the power unit being mounted with the crankshaft extending transversely with respect to the motor vehicle, characterized in that said power unit is mounted in a front portion of the motor vehicle with its center of gravity positioned rearwardly of the drive axles extending from the differential toward front road wheels serving as the drive road wheels with respect to the running direction of the motor vehicle, a steering gearbox extending parallel to the drive axles and a suspension spring are disposed forwardly of the drive axles with respect to said running direction, an intake system coupled to the engine is positioned forwardly of the engine, and an exhaust system coupled to an upper rear portion of the engine and extending generally downwardly and rearwardly from the engine, in between the engine and a toeboard.

* * * * *